Figure 1:
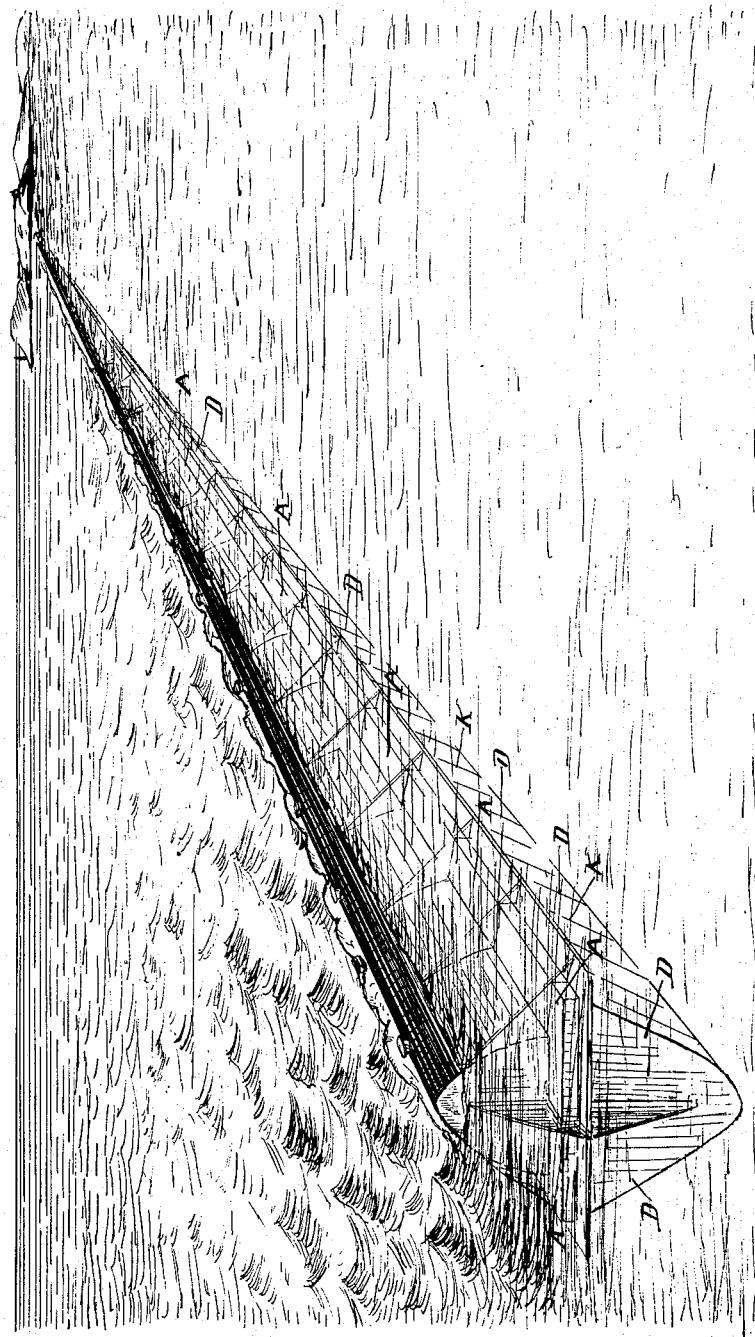

No. 898,128. PATENTED SEPT. 8, 1908.
W. E. MURRAY.
STEADY FLOATING STRUCTURE.
APPLICATION FILED DEC. 17, 1906.
4 SHEETS—SHEET 1.

WITNESSES
INVENTOR
WILLIAM E. MURRAY
BY
ATTORNEY

No. 898,128. PATENTED SEPT. 8, 1908.
W. E. MURRAY.
STEADY FLOATING STRUCTURE.
APPLICATION FILED DEC. 17, 1906.
4 SHEETS—SHEET 2.
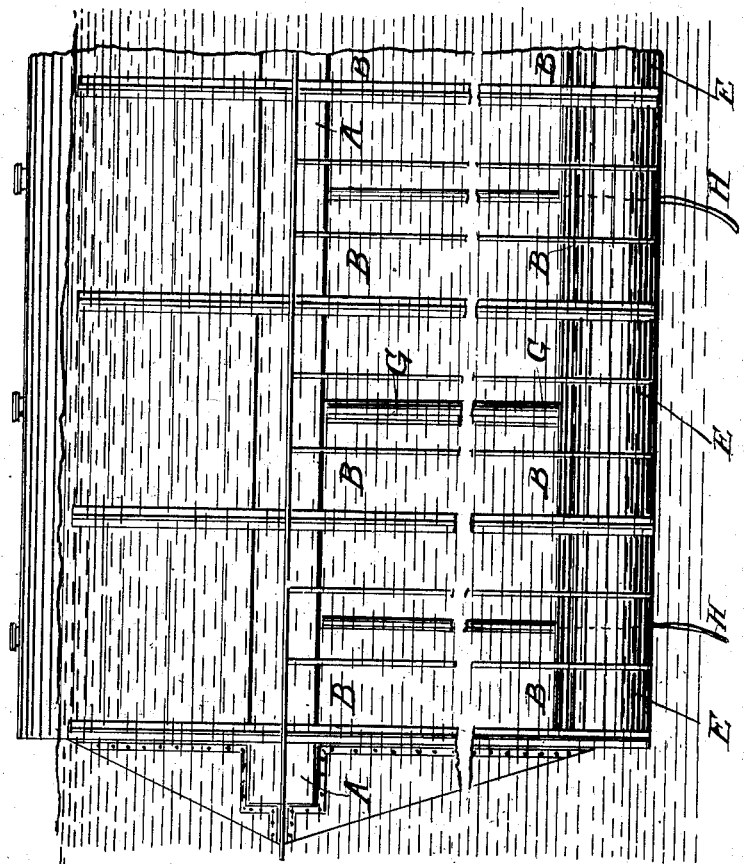
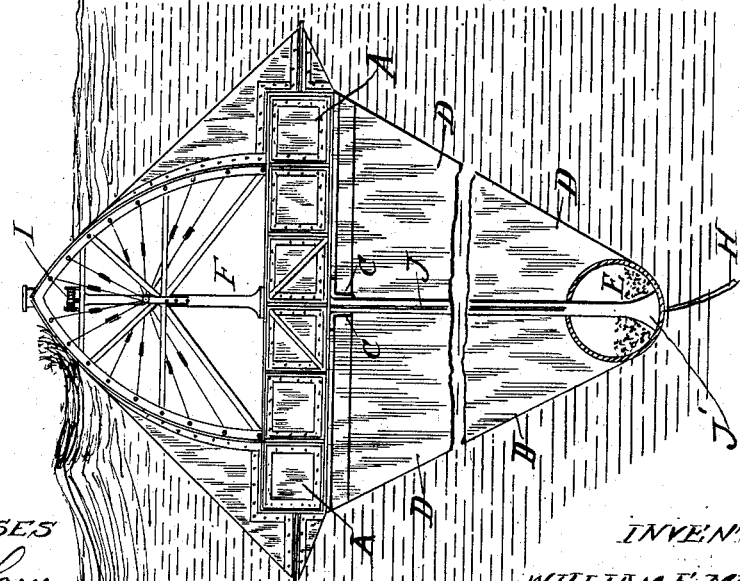

No. 898,128. PATENTED SEPT. 8, 1908.
W. E. MURRAY.
STEADY FLOATING STRUCTURE.
APPLICATION FILED DEC. 17, 1906.
4 SHEETS—SHEET 3.
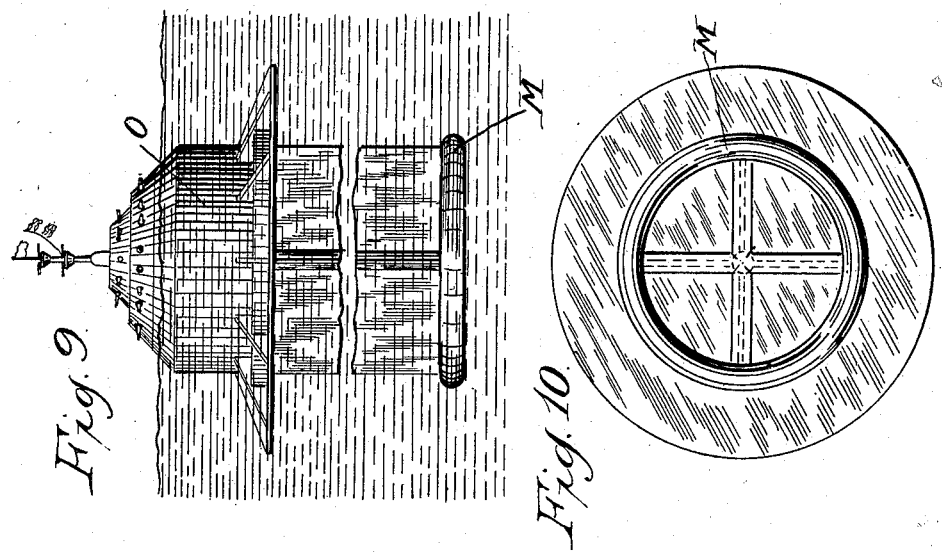
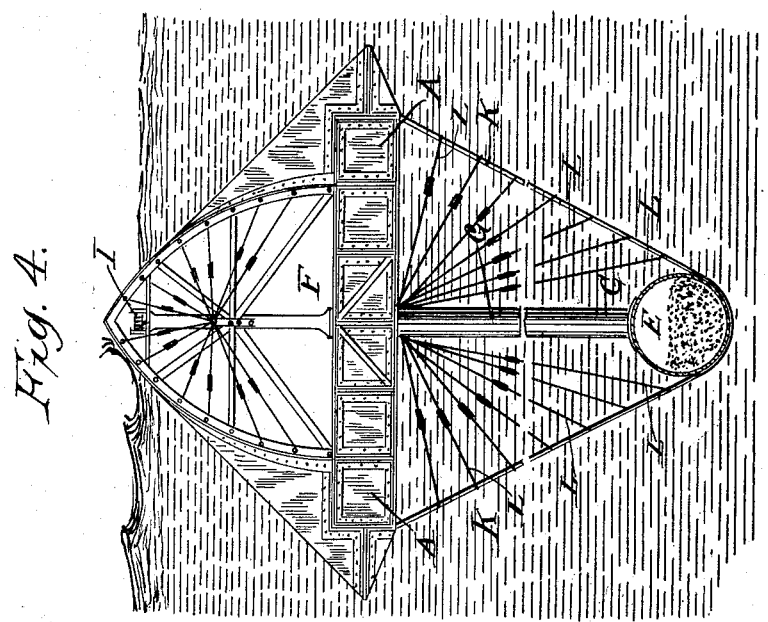
WITNESSES
INVENTOR
WILLIAM E. MURRAY
BY
ATTORNEY

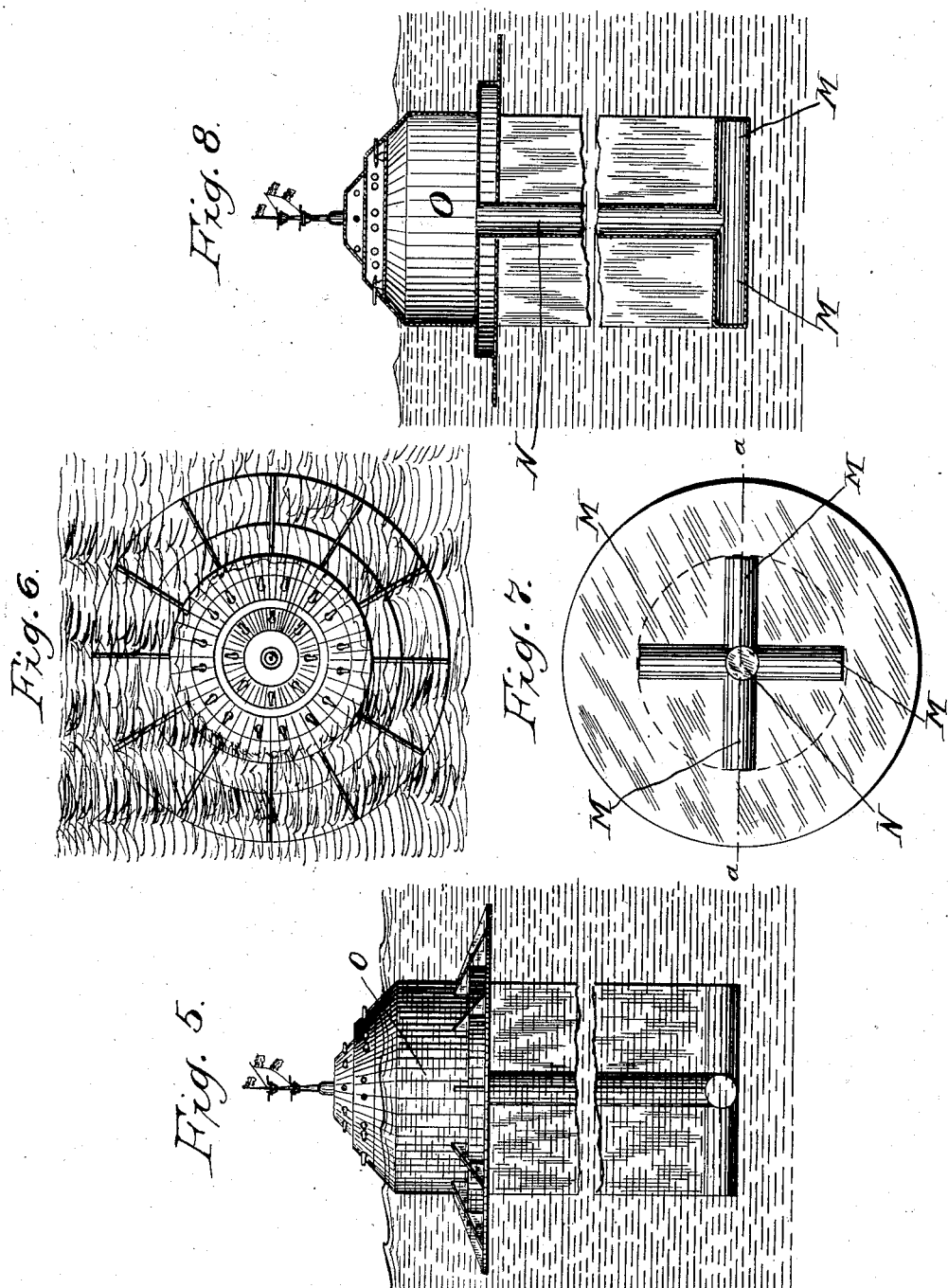

UNITED STATES PATENT OFFICE.

WILLIAM EDWARD MURRAY, OF LOS ANGELES, CALIFORNIA.

STEADY-FLOATING STRUCTURE.

No. 898,128.  Specification of Letters Patent.  Patented Sept. 8, 1908.

Application filed December 17, 1906. Serial No. 348,373.

*To all whom it may concern:*

Be it known that I, WILLIAM EDWARD MURRAY, at present residing at No. 803 Union Trust Building, in the city of Los Angeles, in the county of Los Angeles and State of California, have invented certain new and useful Improvements in Steady-Floating Structures, of which the following is a full, clear, and exact specification, reference being had to the annexed drawings and to the figures and letters marked thereon.

My said invention which relates to certain new and useful improvements in steady floating structures, is a further development of the lower or submerged part of the steady floating structures for which Letters Patent of the United States have been granted to me, No. 825,149, dated July 3rd, 1906, also Letters Patent, No. 826,183, dated July 17th, 1906, and for further improvements in respect of which I have applied for Letters Patent of the United States on the 13th day of August 1906, Serial No. 330,478.

The object of my present improvements is to take advantage of a means of obtaining additional steadiness of the partially submerged floating devices and their analogues, described in the specifications, shown in the drawings, and covered by the claims of each of my two aforesaid Letters Patent, and in the specification, claims, and drawings, of my said application for Letters Patent, at present before the primary examiner in the United States Patent Office.

As has been fully set forth in my aforesaid specifications, I obtain steadiness of flotation by the use of a flange wholly or partly charged with a substance or material having greater density than water, and of sufficient width to resist when submerged to the requisite depth, the disturbing action of the waves of oceans, seas, lakes, or other bodies of water, and upon which foundation the superstructures are carried which provide the necessary buoyancy for maintaining the foundations and superstructures floating steadily at any requisite depth in the wave disturbed water.

By means of my present invention I increase the steadying effect of a broad spread of flange laden wholly or partly with material heavier than water, by means of an additional flange of plate metal projecting vertically downwards from the center of the bottom of the aforesaid laden horizontal flange, and I render such flange stiff horizontally by connecting it throughout its entire length with angle irons and rivets to the bottom of the laden flange, and by giving it vertical stability through connecting it by gussets at intervals, and tension frames at intervals, to the bottom of the laden flange, either throughout the entire width of the flange or throughout a portion of the width thereof. These gussets are of such thickness of metal as to be rigid in themselves, and they are placed at such distances apart as will render the vertical downwardly projecting flange as stiff as all the circumstances of immersion may require, while additional stiffness is imparted to the downwardly projecting flange by means of tension frames hereinafter described.

When my present improvements are applied to a circular or polygonal structure, instead of the downwardly projecting flange being carried the entire length of a longitudinal structure, such as a breakwater, wharf, mole or jetty, I prefer to use two downwardly projecting flanges forming a cross in horizontal section, and this cross of plate metal I attach to the circular or polygonal loaded bottom of a steady floating fortress, a steady floating lighthouse, or other circular or polygonal steady floating structures. I also provide, when occasion requires it, a tube at the extreme end or bottom of the downwardly projecting flange in case of a longitudinal structure, which tube I load with water or with material heavier than water, and in the case of the downwardly projecting flanges being in the form of a cross I attach loading tubes also in the form of a cross at the bottom of the downwardly projecting flanges, and instead of the cross tubes I may use a circular tube with means of access to the said tube from the central part where the two downwardly projecting flanges cross each other, passages for access to and egress from the loading tubes in each case being connected with the buoyant chambers or other non-loaded upper parts of the structures.

Upon the annexed drawings Figure 1, is a perspective view of a steady floating breakwater constructed in accordance with my present improvements. Fig. 2, is an elevation of one end of a steady floating breakwater according to my present improvements. Fig. 3, is a transverse section, showing the braced superstructure, also the gussets for supporting and connecting the downwardly projecting flange to the center of the bottom of the laden flange. Fig. 4, is another transverse section of Fig. 2, showing the construction of the tension frame which I apply in any number desired between the gussets. Fig. 5, is an elevation of the steady floating fortress, such as is shown in my aforesaid application for Letters Patent, having the Serial No. 330,478, and provided with two downwardly projecting flanges in the form of a cross and having loading tubes also in the form of a cross at the bottom of the said downwardly projecting flanges. Fig. 6, is a plan of Fig. 5. Fig. 7, is an inverted plan of Fig. 5. Fig. 8, is a transverse section of Fig. 5, on the line a, a, Fig. 7. Fig. 9, is an elevation of the said steady floating structure, namely, the steady floating fortress shown at Fig. 5, having the downwardly projecting flange in the form of a cross, and also having a circular loading tube connected by its upper parts to the lower edges of these vertically crossing flanges. Fig. 10, is an inverted plan corresponding to Fig. 9, and showing central tunnels or passageways leading from a vertical central passageway whereby access may be had to the interior of the circular loading tube.

In Figs. 1, 2, and 3, the steady floating foundation A, is of the same kind as that shown and described with reference to Figs. 1, 2, 3, 4, and 5, of my application for Letters Patent, Serial No. 330,478, and therefore need not be herein further referred to. To this part of the structure I apply the longitudinal vertical flange B, which is riveted by angle irons C, C, to the bottom of the laden flange A, and descends from the line of its attachment to the laden flange A, to any required depth. This flange B, is stiffened vertically by means of the gussets D, to which the vertical faces of the downwardly projecting flange B, are riveted and connected transversely to the bottom of the laden flange A, as more particularly shown in Figs. 2, 3, and 4. The bottom of the flange B, is preferably provided with a horizontal loading tube E, extending throughout its entire length, which tube may have water admitted thereinto or it may be wholly or partly filled with gravel, sand, broken rock, or other material heavier than water as shown in transverse section at Fig. 4.

For the purpose of connecting the tube E, with the empty chambers of the superstructure F, tubes G, are arranged at intervals large enough to admit of men passing down through them into the loading tube E, from the buoyant chamber F, of the superstructure.

To enable the hawsers H, of the breakwater to be operated by the winches I, shown in the transverse section at Figs. 3, and 4, the tubes of smaller diameter than the tubes G, namely, the tubes J, Figs. 2, and 3, extend from the bottom of the buoyant chamber F, through the laden tubes E, and are provided with bell mouthed ends J', as shown at Fig. 3, to enable the hawsers H, to be spread out therethrough at the requisite angle with requisite facility and with minimum tendency to injury.

The tension frames placed at intervals between the gussets D, consist of the outer ties K, K, as shown at Fig. 4, which ties may be of either T-iron, angle iron, channel iron, or other suitable sections, and these are connected by the tension rods L, L, to the bottom of the loaded flange A, all as shown at Fig. 4, the tension frames L, may be provided with turn-buckles for the purpose of adjusting the stresses between the tension frames, the vertical flange B, and the bottom of the laden flange A.

By means of the construction now described with reference to Figs. 1, 2, 3, and 4, if the depth of the vertical flange B, is made equal to half the width of the laden flange A, then the solid water in which the steady floating structure is immersed pressing equally on opposite sides of the vertical flange B, renders the steady floating structure twice as stable against horizontal or rocking movement as the structure would be by the use of the loading flange alone, and if the vertically descending flange B, be made of greater depth than the half width of the loaded flange A, then the structure is more than twice as steady as with the loaded flange A, in proportion to the extent that the area of its two sides is greater than the area of the bottom of the loading flange A. By this means of increasing the steadiness of flotation it is obvious that steadiness of flotation is limited only by the quantity of material which can be applied in the form of a vertical flange which the buoyancy of the structure will support or float the weight of, and when I use a loading tube E, as in Figs. 1, 2, and 3, then the depth of the flange B, of the gussets D, and of the tension frames may be considerably reduced. The flange B, the gussets D, and the tension frames being shown broken through illustrating that they are not of any particular or definite depth.

When instead of applying my vertical steadying flange B, to the bottom of the structure having considerable length in proportion to its breadth or width, I apply it to circular or polygonal structures, such as a steady floating fortress, a steady floating lighthouse or other circular or polygonal steady floating structures, I obtain twice the steadiness due to a single central vertical flange beneath the loaded flange of the structure by placing two flanges in the form of a cross as shown at Figs. 5, 7, 8, 9 and 10, which may be applied with loading tubes M, in the form of a cross as shown at Figs. 5, 7, and 8, or in the form of a circle as shown at Figs. 9, and 10. In either case a circular central tube N, is provided for access being had from the empty or buoyant chamber O, to either the cross loading tubes M, in Figs 6, 7, and 8, or to the circular central loading tubes N, in Figs. 9, and 10.

I claim as my invention.

1. The steady floating structure, consisting of a horizontal loaded flange carrying a superstructure by which buoyancy is maintained, a downwardly vertical projecting flange provided with a loading tube, a loading tube, gussets, tension frames, said flange being stiffened by the gussets and the tension frames, all for the purpose of producing increased steadiness of flotation in steady floating structures, substantially as set forth.

2. The steady floating structure, consisting of a horizontal loaded flange, two cross vertical downwardly projecting flanges connected to a loaded or loading tube of the structure, said loading tube, means for access to said loading tube, substantially as set forth.

3. The steady floating structure consisting of a horizontal flange, a loaded or loading tube, two vertical downwardly projecting flanges connected to the loaded or loading tube of the structure, and situated crosswise in relation to each other, substantially as set forth.

4. The steady floating structure consisting of a horizontal loaded flange, a loaded or loading tube, two vertical downwardly projecting flanges, means for admitting the passage of hawsers therethrough for anchoring the structures, and the vertical tubes for having access to the loading tubes at the bottom of the said downwardly projecting flanges, substantially as hereinbefore set forth.

In testimony whereof, I have hereunto set my hand and seal at the city of Los Angeles, aforesaid, in the presence of two subscribing witnesses.

WILLIAM EDWARD MURRAY. [L. S.]

Witnesses:
 ST. JOHN DAY,
 IDA M. DASKANE.